(12) United States Patent
Vadlakonda et al.

(10) Patent No.: US 7,957,520 B2
(45) Date of Patent: Jun. 7, 2011

(54) SYSTEM AND METHOD FOR RESPONDING TO AN EMERGENCY AT A CALL CENTER

(75) Inventors: Sravan Vadlakonda, Sunnyvale, CA (US); Vijetha Vadlakonda, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1096 days.

(21) Appl. No.: 11/181,101

(22) Filed: Jul. 14, 2005

(65) Prior Publication Data

US 2007/0025543 A1    Feb. 1, 2007

(51) Int. Cl.
*H04M 5/00* (2006.01)

(52) U.S. Cl. ......... 379/265.02; 379/212.01; 379/221.01; 379/211.01; 379/309

(58) Field of Classification Search ................. 379/309, 379/211.01, 266.04, 113, 207, 266; 455/404
See application file for complete search history.

(56) References Cited

U.S. PATENT DOCUMENTS

| | | | |
|---|---|---|---|
| 4,472,833 A | 9/1984 | Turrell et al. | |
| 4,734,983 A * | 4/1988 | Brick | 30/228 |
| 5,249,223 A | 9/1993 | Vanacore | |
| 5,493,608 A | 2/1996 | O'Sullivan | |
| 5,509,064 A | 4/1996 | Welner | |
| 5,537,470 A | 7/1996 | Lee | |
| 5,633,909 A * | 5/1997 | Fitch | 379/29.01 |
| 5,866,890 A | 2/1999 | Neuner | |
| 5,937,051 A * | 8/1999 | Hurd et al. | 379/212.01 |
| 6,056,551 A | 5/2000 | Marasco | |
| 6,059,184 A | 5/2000 | Ahlstrom et al. | |
| 6,160,877 A | 12/2000 | Tatchell et al. | |
| 6,259,786 B1 | 7/2001 | Gisby | |
| 6,546,082 B1 | 4/2003 | Alcendor et al. | |

(Continued)

FOREIGN PATENT DOCUMENTS

EP    1 030 504 A2    8/2000

(Continued)

OTHER PUBLICATIONS

Nigel Ward and Satoshi Nakagawa, "Automatic User-Adaptive Speaking Rate Selection For Information Delivery", Jun. 25, 2002, (4 pages), University of Tokyo, Tokyo, Japan.

(Continued)

*Primary Examiner* — Curtis Kuntz
*Assistant Examiner* — Joseph J Nguyen
(74) *Attorney, Agent, or Firm* — The Law Offices of Bradley J. Bereznak

(57) ABSTRACT

A system and method for servicing a caller at a contact center includes a plurality of call centers, each including an automatic call distributor (ACD), and an emergency response system that issues an emergency notification signal to the ACD of a call center in response to an emergency condition affecting the call center. In response, the ACD of the call center informs callers of the emergency condition, and then performs a bulk transfer of each of the active calls from the call center to one or more other call centers. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

10 Claims, 2 Drawing Sheets

U.S. PATENT DOCUMENTS

| | | |
|---|---|---|
| 6,567,848 B1 | 5/2003 | Kusuda et al. |
| 6,675,216 B1 | 1/2004 | Quatrano et al. |
| 6,687,877 B1 | 2/2004 | Sastry et al. |
| 6,697,457 B2 | 2/2004 | Petrushin |
| 6,826,194 B1 | 11/2004 | Vered et al. |
| 6,845,361 B1 | 1/2005 | Dowling |
| 6,859,776 B1 | 2/2005 | Cohen et al. |
| 6,940,963 B2 | 9/2005 | Stumer et al. |
| 7,076,041 B2 | 7/2006 | Brown et al. |
| 7,103,170 B2* | 9/2006 | Fain et al. ............... 379/265.02 |
| 7,212,111 B2* | 5/2007 | Tupler et al. ............. 340/539.18 |
| 7,213,073 B1 | 5/2007 | Slavin |
| 7,249,025 B2 | 7/2007 | Junqua et al. |
| 7,295,669 B1 | 11/2007 | Denton et al. |
| 7,308,246 B2* | 12/2007 | Yamazaki et al. ......... 455/404.1 |
| 7,389,351 B2 | 6/2008 | Horvitz |
| 7,436,948 B1 | 10/2008 | Thenthiruperai |
| 2001/0038624 A1 | 11/2001 | Greenberg et al. |
| 2002/0090076 A1 | 7/2002 | Uppaluru et al. |
| 2002/0184346 A1* | 12/2002 | Mani ........................... 709/220 |
| 2002/0196928 A1 | 12/2002 | Johnson et al. |
| 2003/0002650 A1 | 1/2003 | Gruchala et al. |
| 2003/0172185 A1 | 9/2003 | Dezonno |
| 2004/0059580 A1 | 3/2004 | Michelson et al. |
| 2004/0109555 A1 | 6/2004 | Williams |
| 2005/0002516 A1* | 1/2005 | Shtivelman .................. 379/309 |
| 2005/0069102 A1 | 3/2005 | Chang |
| 2005/0089053 A1 | 4/2005 | Zhu |
| 2005/0096912 A1 | 5/2005 | Yacoub et al. |
| 2005/0163302 A1 | 7/2005 | Mock et al. |
| 2005/0059463 A1 | 8/2005 | Gilmore et al. |
| 2005/0226403 A1 | 10/2005 | Lenard |
| 2005/0286705 A1 | 12/2005 | Contolini et al. |
| 2006/0018443 A1* | 1/2006 | Knott et al. ................ 379/88.16 |
| 2006/0030290 A1* | 2/2006 | Rudolf et al. .............. 455/404.1 |
| 2007/0127691 A1 | 1/2007 | Lert, Jr. |

FOREIGN PATENT DOCUMENTS

WO  PTC/AU99/00247  4/1999

OTHER PUBLICATIONS

Jing Zheng, Horacio Franco, and Andreas Stolcke, "Rate Of Speech Modeling for Large Vocabulary Conversation Speech Recognition", May 18, 2001, (5 pages).

Speech Technology and Research Laboratory SRI International, http://www.speech.sri.com.

L.Melscoet, "Alcatel CCweb: Marriage Of The Internet With The Call Center The Alcatel Ccweb Enables a Company to Combine Its Web Site And Call Center Into a Powerful Contact Center", Electrical communication, Alcatel, Brussels, BE, No. 1, 2000, (pp. 43-47).

D.Steul, "Redefining The Call Center: Customer Service On The Internet", Alcatel telecommunications Review, Alcatel, Paris Cedex, FR, Mar. 2000, (6 pages).

* cited by examiner

SYSTEM AND METHOD FOR RESPONDING TO AN EMERGENCY AT A CALL CENTER

FIELD OF THE INVENTION

The present invention relates generally to the fields of telephony an call center communications; more specifically, to methods and apparatus for handling emergencies in the context of a call center communication session.

BACKGROUND OF THE INVENTION

The use of call centers for handling business service calls has increased dramatically in the past decade. The traditional call center was based on a private branch exchange (PBX) that included core automatic call distributor (ACD) functions for connecting an inbound caller to one of a plurality of agents served by the ACD. During the 1990s, the advent of the Internet, electronic commerce, and computer telephony integration (CTI) transformed the call center in ways that enabled delivery of caller data to agents, thereby enabling agents to become more efficient and to improve customer service levels. Today, many enterprises use multiple call or contact centers (both terms are used synonymously and interchangeably in the present application) that extend across different geographic regions, with communications taking place through public switched telephone networks (PSTNs) and Internet protocol (IP) enabled networks that support multi-channel (voice, e-mail, text chat, and Web collaboration) customer interaction.

By way of background, U.S. Pat. No. 6,798,877 teaches a system in which a caller utilizes a personal computer (PC) for establishing an Internet connection to an ACD and for permitting a caller to select a particular agent. A system for providing information about a telephone caller to a telephone agent, wherein caller-specific data of the caller is used to generate a web page that displays the identified information to the agent is taught in U.S. Pat. No. 6,871,212. A system that can notify a customer of the availability status of agents and which allows the customer to select a particular agent from a group of desired agents by pushing a button according to voice guidance given from the ACD is disclosed in U.S. Pat. No. 6,567,848. U.S. Pat. No. 6,333,980 discloses an ACD and method for selectively connecting incoming calls to a plurality of available agents based on proficiency ratings of the particular agents. A method and apparatus for controlling an ACD by a supervisor from a remote location is taught in U.S. Pat. No. 6,654,458. U.S. Pat. No. 6,847,715 discloses a method for controlling administration of ACD queues by a controller and of communicating data to an agent.

An interactive voice response (IVR) system is a well known system that provides information and channels calls to call center service agents in response to the spoken words or touch tone signaling of a telephone caller. A method and apparatus for analyzing the performance of an IVR system with respect to routing of calls or contacts received in accordance with a contact flow model is described in U.S. Pat. No. 6,879,685. U.S. Pat. No. 6,847,715 discloses a system for operatively integrating an ACD and an interactive voice response (IVR) unit in which an interaction input from a caller is stored and then transmitted to an appropriate agent workstation.

A variety of methods for routing calls to different geographically dispersed call centers across an IP-based network are also known in the computer telephony arts. For example, U.S. Pat. No. 6,798,768 teaches multimedia call routing in an IP network. U.S. Pat. No. 6,879,586 teaches an Internet Protocol Network Telephony (IPNT) call center system wherein calls are routed to remote agents over the Internet in accordance with a set of business rules. U.S. Pat. No. 6,137,862 discloses a failover mechanism for restarting a failed computer telephony server process within a call center. The failover mechanism causes one of the secondary server processes to automatically take over as the primary process if the primary process fails. A system for call center queue administration in which a feature server processes calls in a packet network by submitting a questionnaire to callers is disclosed in U.S. Pat. No. 6,882,641. The information in the questionnaire is used to automatically route the call or to reposition the call in the incoming call queue.

One problem with the prior art is that when a real or perceived emergency occurs at a particular call center, the agents at that center are typically instructed to immediately evacuate the building. The emergency condition may be in the form of a immediate or impending natural disaster (e.g., earthquake, tornado warning, flood, etc.) or man-made in nature (e.g., bomb threat, fire in the building, gas leak, chemical spill, false alarm, etc.). Because the agents are usually required to leave the building without delay, the active call sessions are simply left hanging or dropped, with the callers wondering what has happened. At present, there is no mechanism in place in existing call center systems to avoid the dropping of calls when a call center experiences an emergency.

Thus, what is a needed is a mechanism for handling active calls at a call center that is experiencing a real or perceived emergency.

By way of further background, U.S. Pat. No. 6,587,545 teaches a telecommunications system and method for handling special, or abbreviated number calls, such as 9-1-1 emergency calls, that have geographic sensitivity.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method that provides for graceful switchover of calls between call centers in response to a real or perceived emergency is described. In the following description specific details are set forth, such as device types, system configurations, communication methods, etc., in order to provide a thorough understanding of the present invention. However, persons having ordinary skill in the arts will appreciate that these specific details may not be needed to practice the present invention.

According to one embodiment of the present invention, a call center includes an ACD system that responds to an emergency signal by automatically notifying all callers that the call center is currently experiencing an emergency and informing them that their call will be re-routed to another agent. The notification may be by way of an IVR script message either sent by the call center in the emergency state or dispatched from a central call center authority. The ACD system then performs a bulk transfer to forward each of the active calls (i.e., those currently with an agent; not in queue) to another call center located in a different geographic region beyond the range of the emergency. An agent at the new call center then resumes communications with the caller. The present invention thus provides survivability of calls during an emergency without compromising customer satisfaction.

Figure 1:
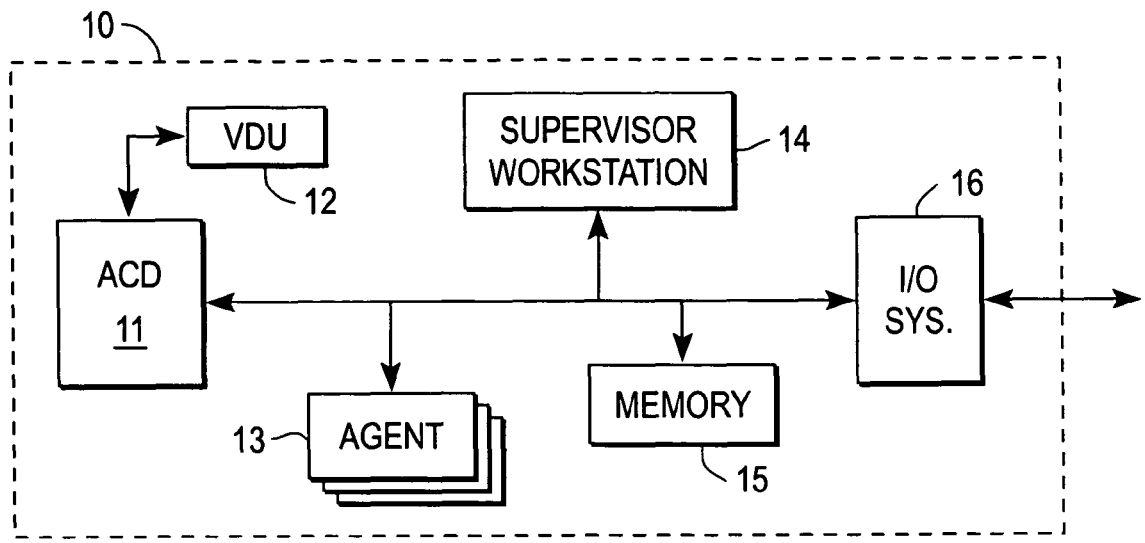
FIG. 1 is a high-level circuit schematic block diagram of a call center in accordance with one embodiment of the present invention.

FIG. 1 is circuit schematic block diagram of an exemplary call center 10 in accordance with one embodiment of the present invention. Call center 10 includes an ACD 11 coupled with a plurality of agents 13, a memory 15, a supervisor workstation 14, an optional video display unit (VDU) 12, and an input/output (I/O) system 16. ACD 11 is configured to receive and service calls from a variety of sources across different communication media via I/O system 16, which interfaces with network devices external to call center 10. ACD 11 may also receive a variety of different external signals, such as an emergency notification signal (packet) from an IP-based emergency response system (ERS), via I/O system 16. In one embodiment, I/O system 16 is also configured with circuitry for receiving wireless communication signals, which wireless signals may include an emergency notification signal.

It is appreciated that the ACD system shown in FIG. 1 typically includes a processor subsystem comprising one or more processors coupled with various software modules that may be also implemented in firmware or some combination of hardware/software elements. Commonly included is a historical reporting module that operates to build up the call history as it develops for use by the various agents during the call center session. The software modules may also optionally include code for generating a visual user interface for a caller communicating with the call center via a personal computer.

Figure 2:
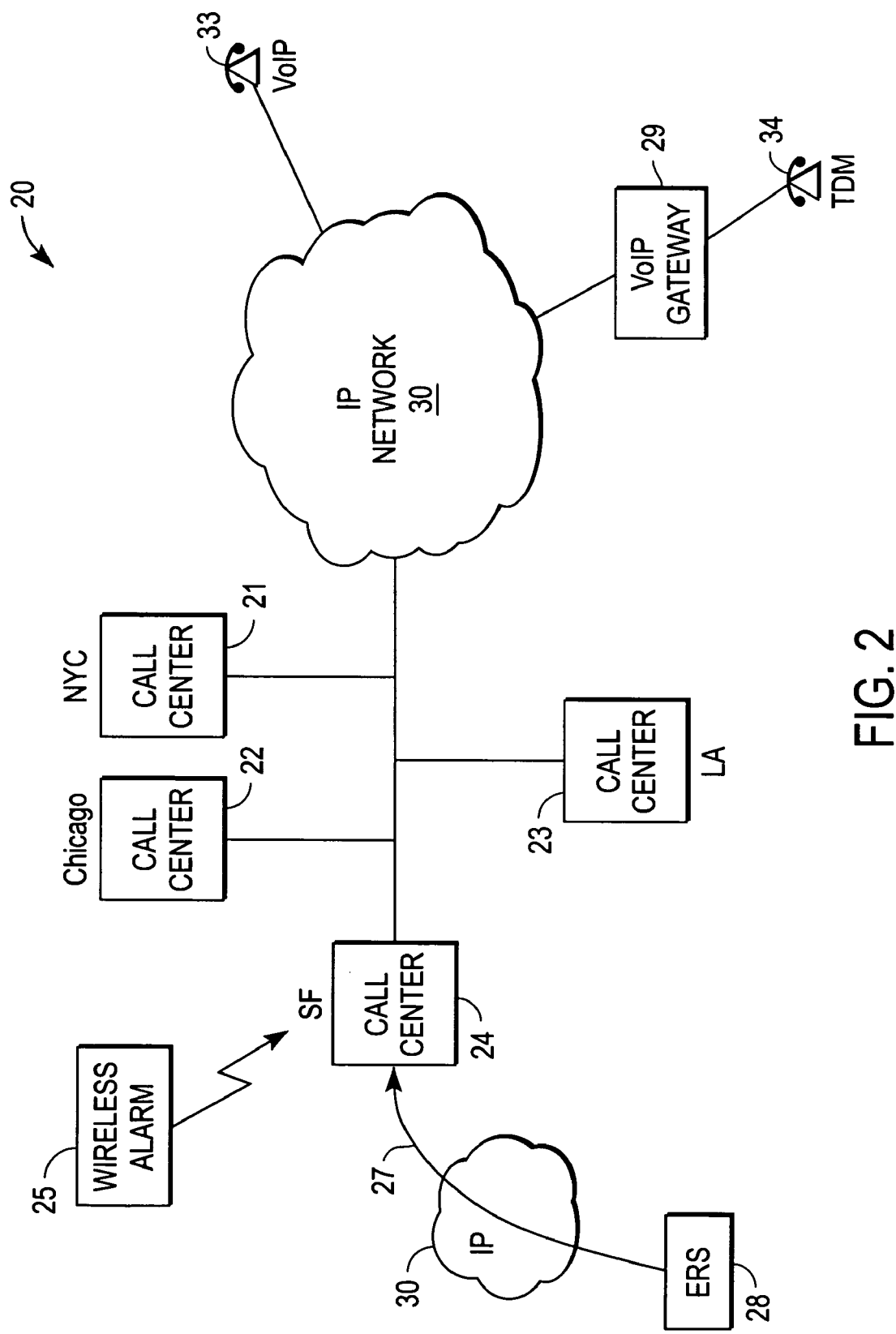
FIG. 2 is a conceptual diagram that illustrates a call center system in accordance with one embodiment of the present invention.

FIG. 2 is a diagram of an IP-based call center system 20 according to one embodiment of the present invention, wherein a plurality of geographically distributed call centers 21-24 are interconnected via an IP network 30. For example, call centers 21-24 are shown being located in New York City, Chicago, Los Angeles, and San Francisco, respectively. The call center system of FIG. 2 is typically configured in a hierarchical manner such that one of the call centers (e.g., call center 22) functions as a central authority that operates to dispatch incoming service calls to the various call centers. In the example of FIG. 2, incoming calls may be received across IP network 30 directly from a voice-over-IP (VoIP) phone 33, or from traditional time-division multiplexing (TDM) device 34 connected to IP network 30 via a VoIP gateway 29. Incoming calls are usually placed in queue by the central dispatching authority before being routed to one of the call centers 21-24.

FIG. 2 also illustrates an emergency response system 28 providing an emergency notification signal 27 to the ACD associated with call center 24 across IP network 30. Signal 27 typically comprises a data packet sent to a call center in a particular geographic region in response to a real or perceived emergency affecting the local call center. ERS 28 may or may not be located in the same geographic location as call center 24. In this example, ERS 28 may be alerted to an emergency condition (e.g., fire, earthquake, etc.) impacting the call center location in a variety of ways. National weather service reports, news alerts, and third party telephone calls are just some of the ways that ERS 28 may become aware of a real or perceived emergency. Regardless of the manner that it is alerted to an emergency, ERS 28 responds by issuing a signal 27 to affected call center 24. Call center 24, in turn, responds to signal 27 by placing the entire call center in an emergency state, as illustrated in the flock diagram of FIG. 3 (discussed in more detail below).

It should be understood that ERS 28 may be integrated as part of the same enterprise or business entity providing call service through call centers 21-24, or, alternatively, ERS 28 may be a separate, third party servicing entity. In addition, emergency notification signal 27 need not be provided via IP network 30; rather, signal 27 may comprise a variety of different communication signal types (e.g., PSTN) that the call center is capable of receiving. Another alternative is to provide an emergency notification signal via a wireless network from a wireless alarm unit 25 that transmits directly to the ACD of call center 24. For instance, such an emergency alarm box unit may be provided outside of the call center building. The alarm may be triggered by an employee of the call center before or after evacuation of the building due an emergency. Like signal 27, the wireless alarm signal provided by unit 25 immediately places call center 24 in an emergency state.

Figure 3:
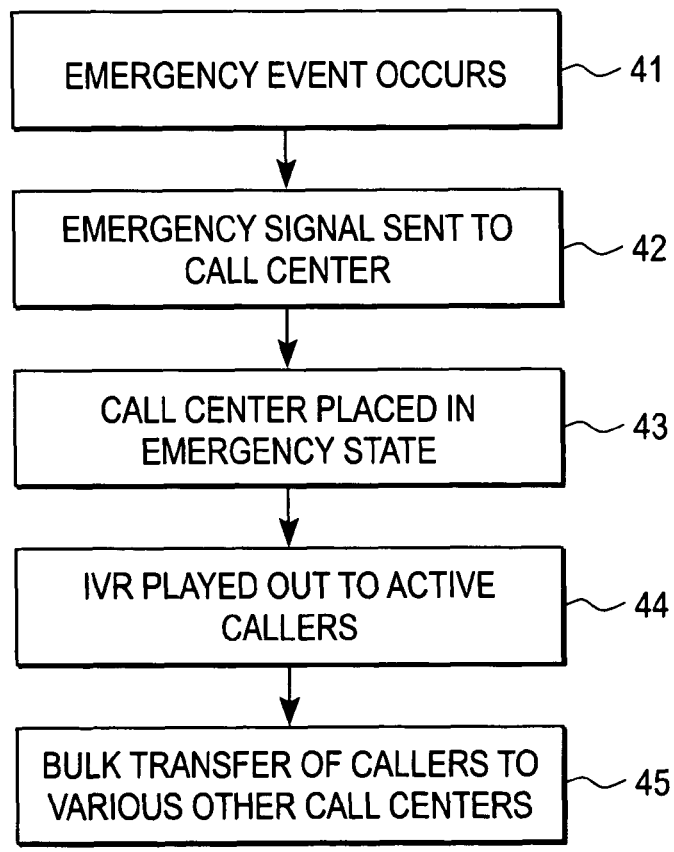
FIG. 3 is a flowchart diagram that illustrates a method of operation according to one embodiment of the present invention.

FIG. 3 is a flowchart diagram that illustrates a method of operation according to one embodiment of the present invention. The process begins with the occurrence of the event giving rise to the real or perceived emergency (block 41). Upon learning of the emergency event, ERS 28 sends an emergency notification signal (i.e., signal 27) to the call center. This is shown happening at block 42. In certain cases, more than one call center may be affected by the emergency, resulting in the issuance of multiple emergency notification signals.

The ACD responds to the emergency notification signal by placing the entire call center in an emergency state (block 43), which, in one embodiment, initiates the following sequence of events. First, an IVR system associated with the ACD of the affected call center immediately plays out an voice script notifying all active callers (i.e., those currently communicating with agents) that the call center is now in an emergency state, and that their call will be automatically re-routed to another agent in a different call center (block 44). Alternatively, the IVR may be played out by the central dispatching authority responsible for re-routing of the calls. In this latter embodiment, the central authority may be notified of the emergency state by a message sent from the call center experiencing the emergency condition, or directly from the ERS.

After all of the active callers have been notified of the emergency state, a bulk transfer of each of the active callers to another call center occurs (block 45). The bulk transfer of active calls may be accomplished in several ways. One way is for the affected call center to perform the transfer of each of the active calls itself. Basically, this involves the ACD of the call center executing code that results in forwarding of each call to another call center, or to a central call dispatching authority which then handles the transfer to another call center. It is appreciated that all of the callers may not necessarily be transferred to the same call center. That is, each of the callers could be transferred to different call centers. As stated previously, another alternative is to have the affected call center send a message to the central call center authority, which can then perform the bulk transfer of all calls to other call centers. This latter embodiment might result in potentially fewer lost calls due to the fact that the impending disaster associated with the emergency may result in total loss of all connections to the call center before call forwarding can be completed. Regardless of the manner that the bulk transfer is accomplished, the call center will remain in the emergency (shut-down) state until the emergency passes and the center is reset to once again receive calls.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-readable memory encoded with a computer program for handling active calls at a call center, when executed, the computer program operable to:

inform callers associated with the active calls of an emergency occurring at the call center responsive to an emergency notification signal that includes a data packet message, the emergency notification signal indicative of an emergency situation occurring at the call center, the emergency situation being of a type that presents a real or perceived imminent danger to agents' ability to service the active calls at the call center; and transfer, further responsive to the emergency notification signal, all of the active calls from the call center to one or more other call centers located geographically remote to the emergency.

2. The computer-readable memory of claim 1 wherein the emergency notification signal comprises a wireless signal.

3. A computer-readable memory encoded with a computer program for handling active calls at a call center, when executed, the computer program operable to:

issue an emergency notification signal to a caller center, the emergency notification signal indicative of an emergency situation occurring at the call center, the emergency situation being of a type that presents a real or perceived imminent danger to agents' ability to service the active calls at the call center;

automatically play a voice script that informs callers associated with the active calls of an emergency at the call center responsive to the emergency notification signal; and perform, further responsive to the emergency notification signal, a bulk transfer of all the active calls from the call center to one or more other call centers geographically remote from the emergency across an Internet protocol (IP) network.

4. The computer-readable memory of claim 3 wherein the emergency notification signal comprises an IP-based message.

5. The computer-readable memory of claim 3 wherein the bulk transfer is performed by a dispatching authority associated with the call center.

6. The computer-readable memory of claim 3 wherein the bulk transfer is performed by the call center.

7. A call center for servicing a plurality of calls from a corresponding plurality of callers, comprising:

an input/output (I/O) system that connects with a network to receive the calls; and an automatic call distributor (ACD) coupled with the I/O system, the ACD being operable to receive an emergency notification signal and, in response, to play a voice message informing the callers of an emergency condition occurring at the call center, the emergency condition being of a type that presents a real or perceived imminent danger to agents' ability to service the calls at the call center, the ACD being further operable to perform a bulk transfer of all the calls to one or more other call centers after the voice message has been played, the one or more other call centers being located geographically remote from the emergency condition occurring at the call center.

8. The call center of claim 7 wherein the emergency notification signal comprises an Internet Protocol (IP) message.

9. The call center of claim 7 wherein the bulk transfer is performed by a processor associated with the ACD.

10. The call center of claim 7 wherein the network comprises an Internet Protocol (IP) network.

* * * * *